(12) United States Patent
Velmurugan

(10) Patent No.: US 10,469,327 B1
(45) Date of Patent: Nov. 5, 2019

(54) OPERATIONS ENVIRONMENT MODEL AND SIMULATION TO REDUCE OPERATOR ERROR

(71) Applicant: Vulcan Inc., Seattle, WA (US)

(72) Inventor: Selvam Velmurugan, Medina, WA (US)

(73) Assignee: Vulcan Inc., Seattle, WA (US)

( * ) Notice: Subject to any disclaimer, the term of this patent is extended or adjusted under 35 U.S.C. 154(b) by 197 days.

(21) Appl. No.: 15/787,538

(22) Filed: Oct. 18, 2017

(51) Int. Cl.
*H04L 29/06* (2006.01)
*G06F 17/40* (2006.01)
*H04L 12/24* (2006.01)
*G09B 19/00* (2006.01)
*H04L 29/08* (2006.01)
*G06N 20/00* (2019.01)

(52) U.S. Cl.
CPC ............. *H04L 41/14* (2013.01); *G06N 20/00* (2019.01); *G09B 19/0053* (2013.01); *H04L 67/025* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 2004/0049372 A1* | 3/2004 | Keller | ..................... | H04L 41/06 703/22 |
| 2009/0171706 A1* | 7/2009 | Bobak | ..................... | G06Q 10/06 705/7.39 |
| 2014/0156806 A1* | 6/2014 | Karpistsenko | .......... | G06F 16/25 709/219 |
| 2015/0127807 A1* | 5/2015 | Billore | .................. | H04L 41/145 709/224 |
| 2016/0188767 A1* | 6/2016 | Razin | .................... | G06F 17/509 703/13 |

\* cited by examiner

*Primary Examiner* — Natisha D Cox
(74) *Attorney, Agent, or Firm* — Davis Wright Tremaine LLP

(57) ABSTRACT

A first resource and a second resource are identified from configuration data of a computing environment. A model that represents the first resource associated with a first weight, the second resource associated with a second weight, and a communication path between the first resource and the second resource is generated. As a result of receiving a command to perform against the first resource, a determination that the second resource would be impacted by performance of the command is made based at least in part on the communication path, a score that represents an impact of the command in the computing environment is calculated based at least in part on the first weight and the second weight, and an action determined based at least in part on the score is performed.

20 Claims, 7 Drawing Sheets

OPERATIONS ENVIRONMENT MODEL AND SIMULATION TO REDUCE OPERATOR ERROR

BACKGROUND

The complexity of computing services of various types offered by computing resource service providers has increased significantly in recent years with the growth of cloud computing. Many customers of computing resource service providers have become highly reliant upon the availability of such services for their business operations. These computing services are often supported by a distributed system of computer hosts and other computing resources maintained by the computing resource service providers. Yet, even with the increased complexity of the computing environment underlying the provided services, human operators are often still relied upon to perform certain maintenance and administration tasks, which introduces the risk that an inadvertent human error could affect the ability of the distributed system to provide the computing services properly to the customers of the computing resource service providers. As distributed systems become larger, and as customers of the computing resource service providers become more reliant on the computing services provided, the risk becomes greater, as does the ability to prevent or mitigate against such human errors.

DETAILED DESCRIPTION

Techniques and systems described below relate to a heuristic system for building an internal representation of a computing environment and, using the representation, determining the impact a command would have on computing resources within the computing environment if executed in order to identify potential unintentional impact to the computing environment. In one example, a set of computing resources in a computing environment is identified from configuration data. A dependency graph having nodes representing the set of computing resources and at least one edge representing a communication path between a pair of computing resources in the set of computing resources is generated. A set of weights is associated with the nodes, based on an analysis of a logfile of a set of events that occurred in the computing environment. As a result of receiving a request from a client device to perform a command, an impacted subset of the set of computing resources is determined based on the logfile and at least one edge. Further, as a result of receiving the request, an impact score is calculated based on a subset of the set of weights associated with the impacted subset of computing resources. Finally, authorization to perform the command is requested as a result of the impact score reaching a value relative to a threshold.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, specifically the field of system administration, by determining the potential impact of commands prior to their execution. Additionally, techniques described and suggested in the present disclosure improve the functioning of computing systems by flagging commands that, if executed, could cause slowdowns or faults in the computing environment. Moreover, techniques described and suggested in the present disclosure are necessarily rooted in computer technology in order to overcome problems specifically arising with the potential for human error to impact system availability adversely in a distributed computing environment.

Figure 1:
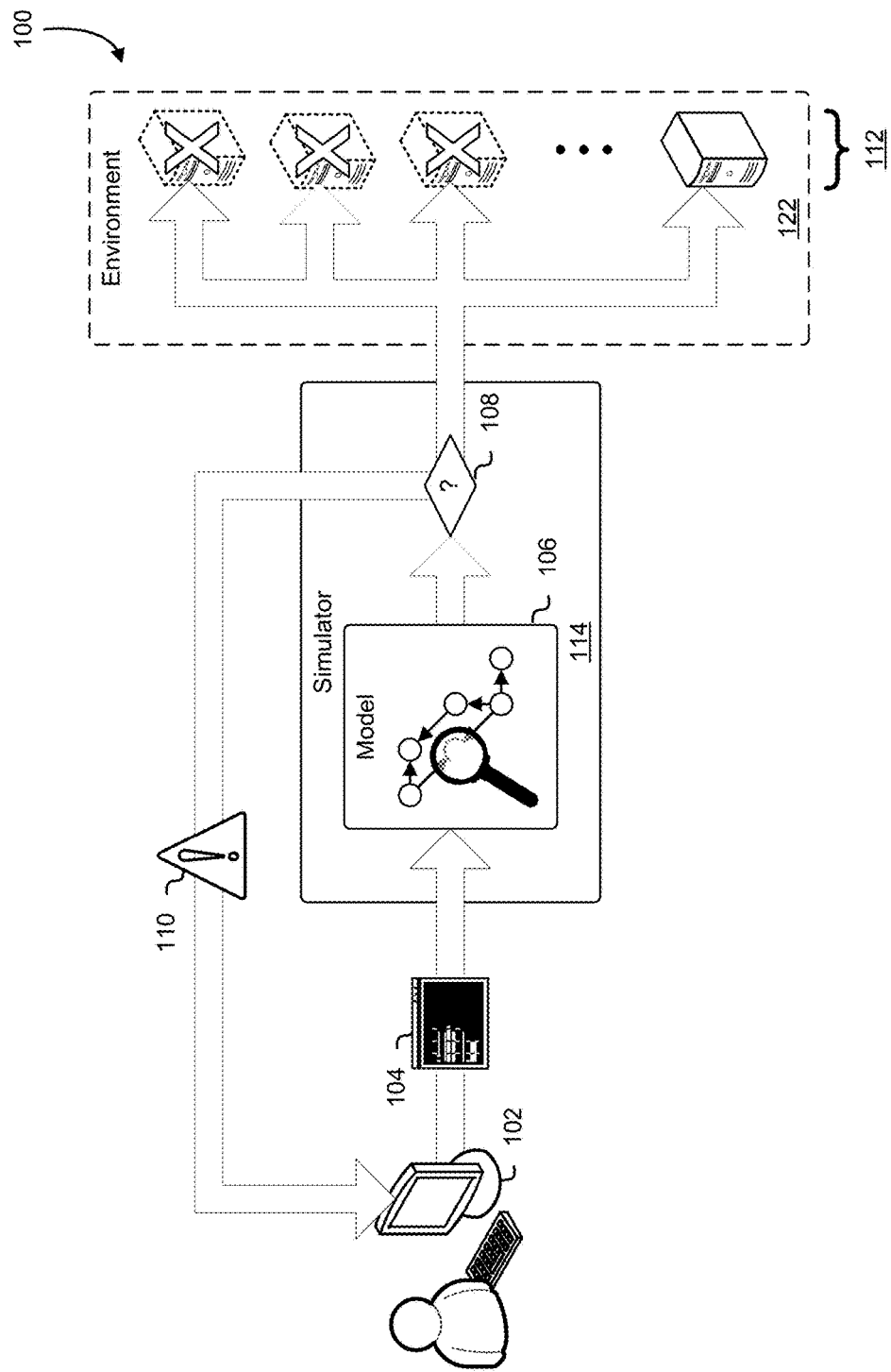
FIG. 1 illustrates an example of an operation simulation service in accordance with an embodiment.

FIG. 1 illustrates an example embodiment 100 of the present disclosure. As illustrated in FIG. 1, the example embodiment 100 may include an operator 102 that submits a command 104 to perform an operation on a subset of a set of computing resources 112 running in a computing environment 122. A simulator 114 intercepts the command 104 and, using a dependency model 106 of the computing environment 122, makes a determination 108 whether to send an alert 110 to the operator 102 about an estimated impact of performing the command 104 or whether to proceed with performing the command 104.

The operator 102 may be an individual with a computing device capable of submitting the command 104 to the computing environment 122. The operator 103 may have access permissions to a subset of the set of computing resources 112 in accordance with a security policy. In some examples, a "policy" refers to information defining permissions and constraints on users, applications, and other entities to access computing resources. The computing device of the operator 102 may be embodied as a physical device and may be able to send and/or receive requests, messages, or information to the set of computing resources 112 over a network. Examples of such devices include personal computers, cellular telephones, handheld messaging devices, laptop computers, tablet computing devices, set-top boxes, personal data assistants, embedded computer systems, electronic book readers, and the like, such as the electronic client device 702 described in conjunction with FIG. 7. Components used for such a device may depend upon the type of network and/or environment selected. Communication over the network can be enabled by wired or wireless connections and various combinations.

The set of computing resources 112 (also referred to "resources") may be any of various types of computing resources under the control of a computing resource service provider, such as computing hosts for hosting virtual machine instances, data storage servers, virtual machines, software containers, routers, databases, applications, services, and the like. In some examples, the term "host" refers to a physical computing system, virtual machine, or software container that hosts one or more applications or services.

Note also that in some examples the term "virtual machine" refers to an emulation, in software and/or hardware of a physical computer system, such that software executing in the virtual machine environment behaves as if the virtual machine were a physical computer. Similarly, in some examples, a "software container" (also referred to as a "container") may be a lightweight, virtualized instance running under a computer system instance that includes programs, data, and system libraries. In contrast to a virtual machine, which abstracts an entire hardware device, a software container may simply be an operating system kernel. Although examples in the present disclosure refer to the computing resources as hosts, it is contemplated as within the scope of the present disclosure that other types of computing resources may be used in addition to or alternative to hosts.

The computing environment 122 may be system of distributed computing devices under the control of a computing resource service provider and used to provide various computing services to customers of the computing resource service provider. In some examples, a computing service (also referred to herein as a "service") refers to an executing computer application that provides functionality to a resource in the computing environment 122, such as a virtual machine for data processing or application execution, a web server for providing a web interface, a permission service for specifying permissions of users of other services, a policy management service for creating, storing, and executing security policies, an cryptography service for managing encryption keys, a data storage service for data storage, and so on. Examples of services include virtual computer system services, block-level data storage services, cryptography services, on-demand data storage services, notification services, authentication services, policy management services, task services, and/or other such services. Not all embodiments described include all of the services described, and additional services may be provided in addition to, or as an alternative to, services explicitly described.

The command 104 may be a directive to a computer program or computing device to perform a specific task. The command 104 may be a directive submitted by the operator 102 through a command-line interface, a graphical user interface, or some other interface. The command 104 may be manually input by the operator 102, such as by typing the command 104 using an input device (e.g., a keyboard) or selecting an options from a menu. The command may be a statement that includes an operation to be performed and information specifying the object or objects (e.g., a subset of computing resources) to which the operation is to be performed. The command 104 may be executed by an appropriate command interpreter to cause the appropriate operations to be fulfilled.

In an example, the operator 102 intends to send a command to remove a subset of hosts from the set of computing resources 112 in engineering cluster 1 in subregion 2 of region using the following command:
%>remove-hosts-hostclass REGION1-SUBREGION2-ENG-CLUSTER1
where "remove-hosts" is a system administrator (sysadmin) program and "-hostclass" is an input parameter specifying the group/class of hosts to be removed. However, the operator 102 instead mistypes the command 104 as:
%>remove-hosts--hostclass REGION1-SUBREGION2-CLUSTER1

The effect of execution of the above command, if unchecked, would be not only to remove engineering cluster 1 hosts, but also all other cluster 1 hosts in subregion 2 (e.g., marketing cluster 1 hosts, invoicing cluster 1 hosts, etc.), which could have serious negative impact on the computing environment 122. However, using the system of the present disclosure, this impact may be avoided as described below.

The dependency model 106 may be a structure comprising a set of nodes that represent computing resources in the computing environment 122, with pairs of nodes linked by edges that represent flow of communication between the computing resources. The structure may be any of a variety of graphs, including an undirected graph, a directed graph, a mixed graph, a weighed graph, a tree, a multigraph, or an acyclic graph. The simulator 114 may build the dependency model 106 using a software program, such as the crawler application 214 of FIG. 2, to read and analyze configuration files relating to the setup and configuration of the computing environment 122 to determine the set of computing resources 112 in the computing environment 122 and the relationships between resources of the set of computing resources 112.

The dependency model 106 may have multiple tiers of nodes due in a large distributed computing environment. The resources represented in the dependency model 106 may be distributed across multiple data centers, across various availability zones, or even across different geographical regions. In some examples, an "availability zone," also known as a fault isolation overlay, refers to a logical grouping of computing devices at least in part for fault tolerance purposes (e.g., computing devices in different geographic regions, computing devices grouped by power source, etc.), such as in variously located data centers. Different types of availability zones may overlap; for example, a set of computing devices in a particular power availability zone may contain some of the same computing devices in a particular network availability zone.

The dependency model 106 may provide a map for determining which resources may be impacted by the command 104. For example, a command that stops or restarts an application or service on a host may impact the ability of dependent resources to perform their designated functions. Thus, in some embodiments nodes in the dependency model 106 may represent such services and/or applications as the resources (e.g., physical computing devices, virtual machines, software containers, services, applications, etc.) that depend on those services and/or applications.

Figure 3:
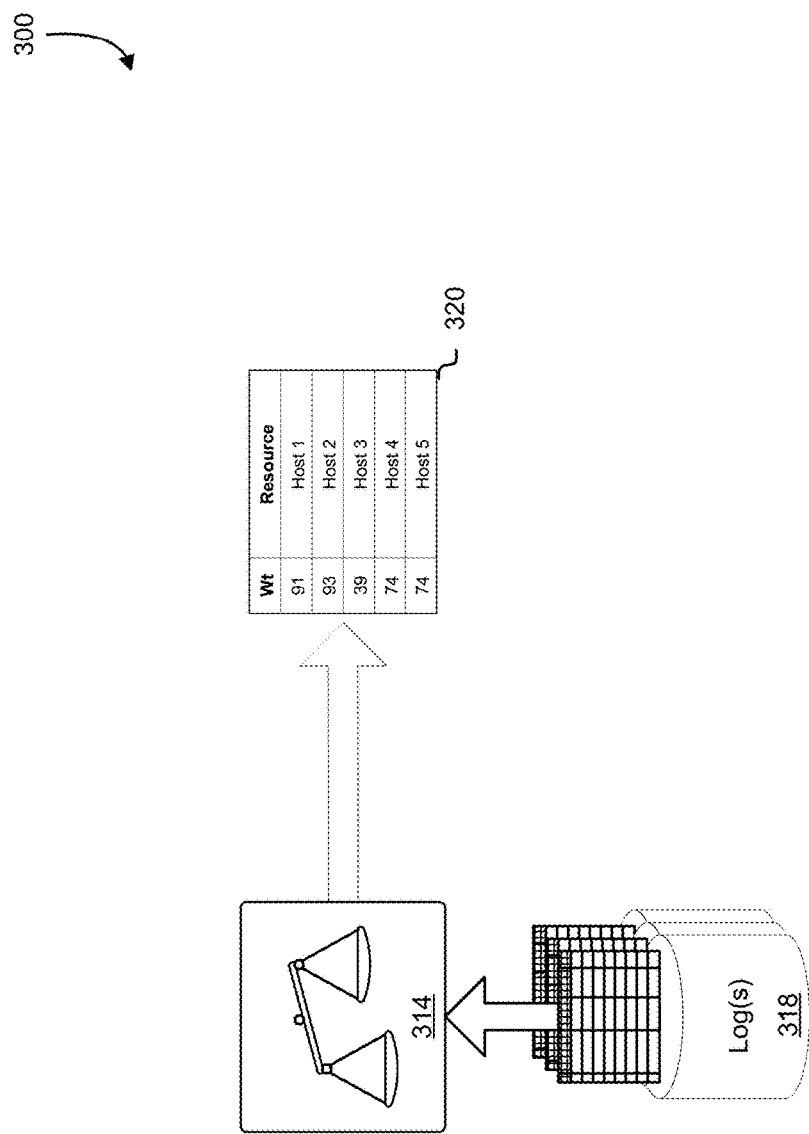
FIG. 3 illustrates an example of assigning weights to resources in accordance with an embodiment.

Each node of the dependency model 106 may be associated with a weight reflecting a significance of the respective computing resource (see FIG. 3). The simulator 114 may identify, using the dependency model 106 and one or more logfiles (e.g., the logfile 418 of FIG. 4), which nodes would be directly impacted by the command 104 and, based on the dependencies (e.g., the edges and direction of communication) between the nodes, which nodes would be indirectly impacted by the command 104. Based on the weights associated with the impacted nodes, the simulator 114 may estimate (e.g., in the form of an impact score) of the impact that fulfilment of the command will have on the computing environment 122. In some embodiments, the weights in the calculation differ depending on whether the impacted node is directly versus indirectly impacted; for example, an indirectly impacted node may be given less weight (e.g., 80% weight value) than a directly impacted node (e.g., 100% weight value).

Further expanding upon the above example where the operator 102 mistypes a "remove-hosts" command, the dependency model 106 in the example comprises a basic representation that allows mapping between different host-classes to hosts. In the example, the hosts are weighted, similar to the weights 320 of FIG. 3, thereby giving each host a host rank (e.g., weight). In the example, the simulator 114 may utilize a log analyzer, such as the log analyzer 314 of FIG. 3, to analyze system and/or application logfiles of the computing environment 122 for previous executions of the command "remove-hosts." Entries in the application logfiles of the server from which the command (e.g., "remove hosts") was executed may include information such as the number of times the command was executed, dates and times the commands were executed, duration of the command execution, input parameters and values for the commands, result/status of the execution, and so on.

In some cases, dates and times may be relevant because there may be increased demand for certain computing resources at different times of the day and on different days of the year or week. Dates and times that certain commands were executed can be used to determine when those certain commands are executed on dates or times outside the norm. For example, an e-commerce provider may have less tolerance for negative impact to the computing environment during holiday sales periods. The simulator 114 can thereby compute an impact score based on the hosts affected and the host rank of each host. In one example, the impact score is the sum of all host ranks of hosts affected, normalized to fall within a range between 0 and 100. In another example, the impact score is a result from a machine learning algorithm taking as input information such as described above.

The determination 108 may be a result of evaluating a set of rules against the impact estimation. For example, if the estimation is an impact score having a value relative to a first threshold (e.g., meets or exceeds the first threshold), evaluating the set of rules may cause the simulator 114 to make the determination 108 to send the alert 110 to the operator 102 warning of the potential impact of performing the operations. As another example, if the estimation is an impact score having a value relative to a second threshold (e.g., falling below the second threshold), evaluating the set of rules may cause the simulator 114 to make the determination 108 that impact is minimal and allow the operations to be performed in the computing environment 122 without sending the alert 110 to the operator 102. As still another example, if the estimated impact score is above (or below) a certain standard deviation (e.g., one standard deviation, two standard deviations, etc.) of impact scores calculated for previous executions of the same command, the simulator makes the determination 108 to send the alert 110.

The alert 110 may be a message, prompt, popup window, audible or visible alarm, or some other notification transmitted from the simulator 114 to the operator 102. In some embodiments, the alert 110 may be such a notification sent to an administrator or some other entity. For example, in some embodiments, if the impact score exceeds a threshold, the alert 110 may be a prompt to an administrator for approval to proceed with executing the command 104; if approval is denied or not given, the simulator 114 may prevent the command 104 from being executed, such as by declining to proceed with performing the command.

Further referring to the above example where the operator 102 mistypes a "remove-hosts" command, based on the impact score calculated and compared with typical impact scores for executions of "remove-host" commands, the simulator 114 arrives at the determination 108 that the current impact score has an uncharacteristically high impact (e.g., above a certain standard deviation). As a result, the simulator 114 sends the alert 110 to the operator 102 and prompts the operator 102 to re-evaluate/confirm the command 104 before proceeding with execution of the command 104. In this manner, the impact of the command 104 may be simulated and the operator 102 warned about serious negative impact and may be provided with a chance to change or abort the command 104 before execution. In some of these embodiments, if the current impact score is characteristic (e.g., within a particular range of impact scores specified as normal, below a threshold standard deviation, etc.) of the command 104, the simulator 114 may determine that no further confirmation is needed and proceed to cause the command 104 to be performed.

In some embodiments, a service provided by a computing resource service provider may include an interface that enables a customer of the computing resource service provider to submit requests via, for example, appropriately configured API calls to the service. The service may include a service interface that enables the service to access another service (e.g., to enable a virtual computer system of a virtual computer system service to store data in or retrieve data from an on-demand data storage service, access a block-level data storage device provided by a block-level data storage service, etc.). A service interface may also provide secured and/or protected access to the service via encryption keys and/or other such secured and/or protected access methods, thereby enabling secure and/or protected access for communication between services. Collections of services operating in concert as a distributed computer system may have a single frontend interface and/or multiple interfaces between the elements of the distributed computer system. The resources within the computing environment 122 may be communicatively coupled by wires (e.g., Ethernet cable) or by wireless communication channels. In some examples, "communicatively couple" refers to linking in a manner that facilitates communications.

Similarly, the hosts affected by the previous executions of "remove-hosts" may have their own system, application, and access logs containing details on when corresponding local processes were initiated (as a result of the "remove-hosts" command), what steps were executed, durations of execution, changes to request-rates and error rates, and so on. Additionally or alternatively, individual host-related metrics (e.g., processor load, memory usage, disk space, network input/output (I/O), disk I/O, etc.) at times before, during, and after the previous executions of "remove-hosts" may also be analyzed to determine further impact of execution of the command 104.

Figure 2:
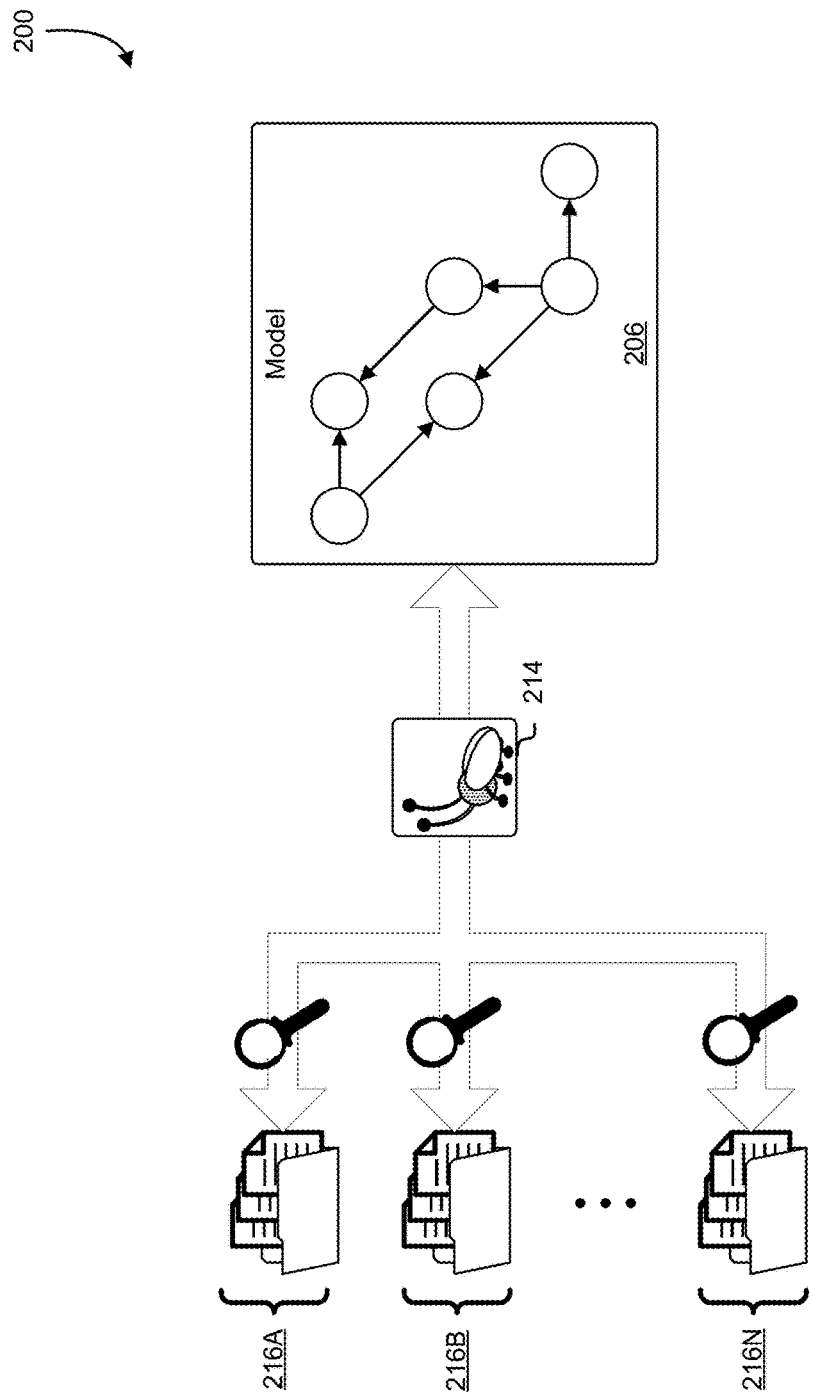
FIG. 2 illustrates an example of generating a dependency model from configuration data in accordance with an embodiment.

FIG. 2 illustrates an example 200 of generating a dependency model from configuration data in an embodiment of the present disclosure. As illustrated in FIG. 2, the environment 200 may include a crawler application 214 that, when executed, reads through one or more configuration files that contain parameters for a computing environment, such as the computing environment 122 of FIG. 1, in order to identify the computing resources (e.g., the set of computing resources 112) within the computing environment and relationships between the computing resources. Using this information, the crawler application 214 may generate a model 206 of the computing resources in the computing environment.

The model 206 may be a data structure, such as a directed graph, acyclic tree, or other structure that is a representation of computing resources (e.g., hosts) and/or applications or services in the computing environment. In an embodiment where the model 206 is a directed graph, the direction of the directed graph reflects the flow of communication (e.g., requests made) between the two nodes. For example, a direction could indicate that a first host, represented by a first node, submits requests to a second host, represented by a second node. The model 206 may further include information such as resource classifications, types of applications/services, and other topological information.

The crawler application 214 may be a software application that is designed to read and interpret configuration data (e.g., from configuration files or database entries) used to configure the computing environment. The crawler application 214 may utilize heuristics to identify, from the configuration data, identities of hosts and/or other computing resources in the computing environment. For example, the crawler application 214 may be designed to identify names (e.g., hostnames), uniform resource indicators, or Internet Protocol (IP) addresses that correspond to resources in the configuration data. The crawler application 214 may further determine from the configuration data, which hosts or other computing resources have access to, communicate with, or depend on other hosts in the computing environment. The crawler application 214 may have associated permissions that allow the crawler application 214 to access the configuration data. The crawler application 214 may further be associated with a set of credentials for authentication with services in the computing environment in order to obtain access to the configuration data. The crawler application 214 may be hardcoded or may be given as input (e.g., through an interface or via its own configuration file) information (e.g., locations of configuration files, Internet Protocol addresses of the services to authenticate to, information usable by the crawler application 214 to interpret the configuration data (e.g., how to locate certain fields in the configuration data structure)) usable by the crawler application 214 to access and interpret the configuration data.

The configuration files 216A-16N may each be one or more files containing parameters (also referred to as configuration data) for various settings of the services in the computing environment. For example, the set of configuration files 216A may be a configuration file containing information usable by the crawler application 214 to identify the hosts and/or other resources supporting a first service. Likewise, the set of configuration files 216B may be a plurality of configuration files containing information usable by the crawler application 214 to identify the hosts and/or other resources of a second service. The configuration files may be any suitable format, such as Extensible Markup Language (XML), JavaScript Object Notation (JSON), delimited text, and/or another appropriate file. It is further contemplated that the configuration files may not be files per se, but may be database records, memory regions, or other data storage types that store the configuration data.

FIG. 3 illustrates an example 300 of assigning weights to resources in an embodiment of the present disclosure. As illustrated in FIG. 3, the example 300 includes a log analyzer 314 that reads and analyzes service logs 318 of services in a computing environment, such as the computing environment 122 of FIG. 1, and determines weights to assign to the computing resources in the computing environment.

The log analyzer 314 may be a software application that is designed to read and interpret data from the service logs 318. The data may be system, application, access, event, or other logged data that includes communications between processes, resources (e.g., hosts), and/or users. The service logs 318 may be one or more logfiles, such as system logs, application logs, access logs, and/or other event logs to which a service caused a record of events that occurred in relation to running of the service to be written. The service logs 318 may include logs from servers on which a command is executed, logs from servers to which the command is directed, and/or servers indirectly or directly affected by execution of the command. For example, the physical hosts affected by the previous executions of a command may have their own application and access logs that contain details on when corresponding local processes were initiated (as a result of the command being executed), what steps were executed, durations of execution, changes to request-rates and error rates, and so on, analyzed by the log analyzer 314. Additionally or alternatively, individual host-related metrics at times before, during, and after the previous executions of commands may also be analyzed by the log analyzer 314 to determine hosts impacted by such commands and assign weights thereby. Information in logfiles may additionally or alternatively include information such as the number of times commands were executed, dates and times the commands were executed, duration of the command execution, input parameters and values for the commands, result/status of the executions, and so on.

The data may be logged automatically by the service. The data may include the type of event, a summary of the content of the communication, a timestamp for the event, and an identity of a resource associated with the event. The log analyzer 314 may analyze the service logs 318 to identify the resources used to perform various operations and commands, the frequency that the resources perform various operations and commands, and/or other resources that are relied upon in performing the various operations and command. Based on this data, the log analyzer may assign the weights 320 to the resources.

Each of the weights 320 may be a value (also referred to as a "host rank") assigned to a resource reflecting a significance of the particular resource. The weight of a particular resource may be determined based on such factors as frequency of access (e.g., number of hits within a particular time frame) and the weight of a resource or resources that submit requests to the particular resource. The weights 320 may be affected by the type of service or type of data provided by the corresponding resource. For example, several servers may be involved in providing a webpage to a customer, but not all of the servers involved may be critical; for example, some of the servers may be involved to provide certain graphical elements that enhance the user experience but are not vital to the core functionality of the webpage. If such servers were off-line, a default icon could be provided instead of the graphical element, or the graphical element could just be missing, while the rest of the webpage can be provided to the user as usual. In cases like this, the non-critical resources may be determined by the crawler application 214 or log analyzer 314 from logfiles (e.g., such as by the types of information provided or operations performed according to the logfiles) and assigned less weight than more critical resources, or resources for which criticality is unknown.

In some cases, the weights 320 may be affected by the importance of the corresponding resource to a customer that utilizes the resource. For example, if a customer is in the business of operating a web search engine, resources associated with the core functionality of the web search engine may be weighted more heavily than resources that provide complementary functionality (e.g., weather reports, email, news headlines, search trends, etc.). As another example, resources that provide support to a homepage of a website may be considered more important, and consequently be weighted more heavily, than resources that provide support to some of the pages linked from the home page (or linked from those pages) because failure to provide the home page may prevent use of the entire website whereas failure of certain sub-pages may only prevent use of some subset of the website. As still another example, for an e-commerce site, resources that support payment systems may be weighted more heavily than other, non-payment-related resources.

In some embodiments, clickstream data may be logged, and clickstream analysis by a crawler application, log analyzer, or some other application may be used to determine weights for resources. In some examples, "clickstream" refers to the recording of the parts of the screen a user clicks on while web browsing or using another software application. These actions by the user may be logged in logfiles, which may factor into weight assignment. The weights 320 may also be affected by the number and types of requesting hosts. For example, if requests to a serving host (i.e., host that services the request) are received from a high-ranked (e.g., host rank exceeds a threshold) host, then the serving host rank may likewise be high-ranked. Likewise, if the serving host services many requesting hosts, the assigned weight of the serving host may be higher still. Note that although the present disclosure correlates a higher rank with greater significance, it is contemplated that significance may be indicated in other ways, such as by a lower rank, by name, or by level.

Figure 4:
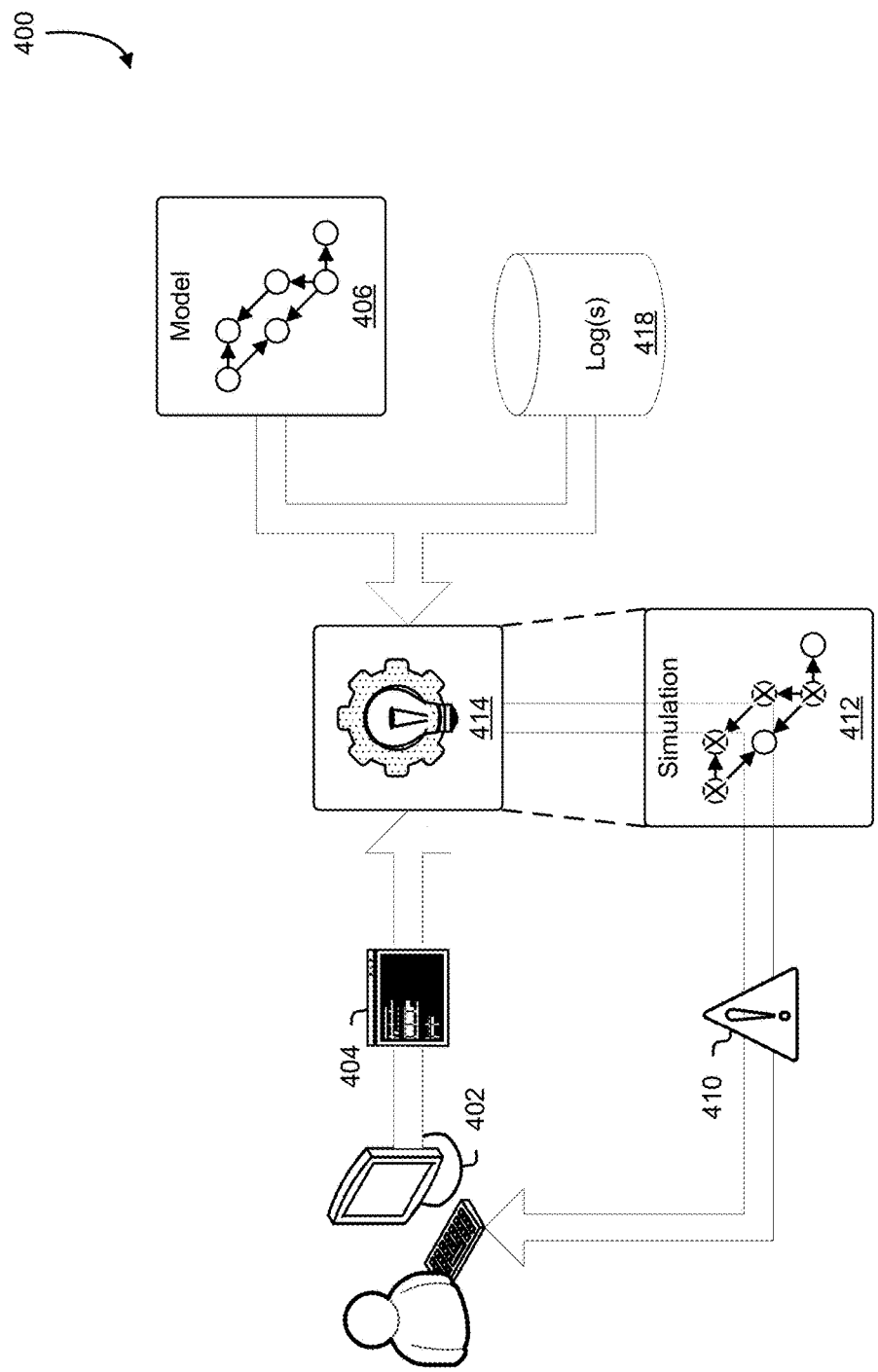
FIG. 4 illustrates an example of simulating a command in accordance with an embodiment.

FIG. 4 illustrates an example 400 of simulating a command in an embodiment of the present disclosure. As illustrated in FIG. 4, the example 400 includes an operator 402 that submits a command 404 to be performed in a computing environment, such as the computing environment 122 of FIG. 1. The command 404 is intercepted by a simulator 414, which takes a dependency model 406 and information from a logfile 418 as input to generate a simulation 412 of the impact that execution of the command 404 could have on the computing environment and sends an alert 410 if the impact is determined to be high (e.g., exceeds a threshold, etc.).

The operator 402 may be an individual, similar to the operator 102 of FIG. 1, such as a system administrator or some other entity having authority to submit the command 404. The command 404 may be a directive to a computing device in a computing environment, such as the computing environment 122 of FIG. 1, that, if executed, affects the performance of one or more computing systems in the computing environment. The dependency model 406 may be a directed graph or other model that represents the topology of the computing environment, such as the model 206 of FIG. 2. The logfile 418 may be one or more files or other data structure to which events that occur, such as previous executions of commands similar to the command 404, within the computing environment, such as the service logs 318 of FIG. 3. The simulation 412 may be a result generated by the simulator 414 that indicates an impact of execution of the command 404.

The alert 410 may be a notification or information that indicates the impact on the computing environment as determined through the simulation 412. The alert 410 may include a confirmation prompt (e.g., via command or popup window, etc.) prompting the operator 402 or an entity with higher authority to approve execution of the command. The alert 410 may include information indicating which resources will be affected, how many resources will be affected, the manner in which the resources will be affected (e.g., deleted, slowed, etc.), or other information potentially relevant to the operator 402 or other entity for determining whether to proceed with executing the command.

The simulator 414 may be a software application, similar to the simulator 114 of FIG. 1, that intercepts commands submitted by operators or other authorized entities and simulates the impact of executing the commands. In some embodiments, the simulator determines whether the command is of a type that should be simulated; for example, in some embodiments non-destructive commands, such as reads and information requests, need not be simulated. The simulator 414 may determine the nodes in dependency model 406 that may be negatively affected by the command 404 and read from the logs historical information for previous execution of the command 404. This historical information and weights of the affected nodes may be input into a set of rules to generate the simulation 412. In some embodiments, the set of rules are heuristics for determining the impact of a command based on input data derived from the dependency model 406 and/or the logfile 418. In some embodiments, the set of rules comprise a machine learning algorithm for determining the impact of a command based on input data derived from the dependency model 406 and/or the logfile 418. In still other embodiments, the set of rules include a combination of the heuristics and machine learning algorithm described above, with the heuristics providing an initial baseline set of rules with the machine learning algorithm adjusting the set of rules over time to provide more accurate assessments as more historical data becomes available (e.g., via the logfile 418)

The operator 402 and other users may provide the simulator 414 with feedback about the accuracy of the simulation 412, and the simulator 414 may incorporate the feedback by modifying the set of rules to provide more accurate simulations. The feedback may be of a variety of forms depending on implementation; for example, the feedback could be a survey requesting that the operator 402 respond with a rating of 0 to 10 reflecting the operator's judgment regarding the accuracy of the provided impact score. The simulator 414 may include one or more machine learning algorithms that utilizes the inputs and the feedback to generate more accurate simulations over time.

In some embodiments, the simulator 414 may be able to train itself without feedback from operators by making estimations regarding the impact of commands (e.g., duration of execution, number of affected resources, which resources are affected, duration of downtime, etc.) and compare the estimations with the actual impact observed after execution of the command 404. The simulator 414 may use this comparison to adjust its machine learning algorithm to provide more accurate predictions.

In some embodiments, the machine learning algorithm of the simulator 414 may include supervised learning techniques, unsupervised learning techniques, semi-supervised learning techniques, transduction or transductive inference techniques, reinforcement learning, developmental learning, and the like. In various embodiments, the logfile data, command data, dependency model data, and weights may be analyzed using one or more machine learning algorithms, such as: decision trees, association rule learning, deep learning, inductive logic programming, support vector machines, cluster analysis, Bayesian networks, naïve Bayes classifiers, learning automata, Gaussian process regression, nearest neighbor, random forest, ordinal classification, k-means clustering, lazy learning, artificial neural network (e.g., convolutional neural network), or generally any suitable machine learning algorithm or combination of algorithms. For example, a set of decision trees can be generated from historical data by splitting the logfile data into subsets based on an attribute value test and partitioned recursively until the splitting has negligible effect on accuracy of the simulation 412.

Although the simulation 412 is depicted in FIG. 4 as a graphical representation of an impact on the topology, this graphical representation is intended to be illustrative only. The simulation 412 may be a value (e.g., impact score from 1 to 100, binary impact score of "good" vs. "bad," percentage of hosts affected, etc.), may be a level (e.g., low, medium, high, etc.), may be an inventory of affected resources and/or the manner in which they will be affected by the command 404, or some other result that indicates the impact of the command 404 on the computing environment. In some embodiments, the simulation 412 is a total number of votes of a plurality of decision trees (e.g., in a random forest) on whether the impact of executing the command 404 is in agreement with the probable expectation of the operator 402.

In some embodiments, if the simulator 414 determines that execution of the command 404 will make certain resources in the computing environment unavailable, the simulator 414 may further generate a simulation representing the extra load upon the available resources due to the unavailability of the certain resources. For example, if the command 404 causes half of the web servers in the computing environment to go off-line, the remaining web servers may experience additional load, which may affect their performance. In these embodiments, this negative effect on the performance of available resources may be further provided with the simulation 412. Such simulations could work the other way as well; commands to add additional virtual web servers in the computing environment, could reduce the load on the other web servers in the computing environment, in such an improvement in performance may be reflected in the simulation 412.

In some embodiments, the alert 410 may additionally or alternatively indicate a cost penalty or benefit to performing the command. For example, removing resources from the computing environment may result in a cost savings from the computing resource service provider, and an estimation of this cost savings may be sent to the operator 402. If the cost savings are greater than the operator 402 expected, the operator 402 may reevaluate whether the command should be executed. For example, if the operator 402 types the command intending to remove two hosts, but due to a typographical error input a command that would remove 20 hosts, the cost savings estimate could alert the operator 402 that he/she is about to remove some vital hosts from the computing environment. Conversely, adding resources to the computing environment may result in additional cost from the computing resource service provider, and upon receiving the estimate of the additional cost, the operator 402 may reevaluate whether the command should be executed.

In some embodiments, the privileges of operators, such as the operator 402, may be tied to the simulated impact of the command. For example, an operator with a first level of access may be able to remove hosts on the condition that the simulated impact of removing the hosts is below a first threshold (e.g., first threshold impact score or first threshold standard deviation). On the other hand, an operator with a second level of access may be able to remove hosts on the condition that the simulated impact of removing the hosts is below a second threshold (e.g., second threshold impact score or second threshold standard deviation), and so on. In this manner, the privileges that the operators of the computing environment have to make changes to the computing environment may depend on various factors, such as number of resources affected, types of resources affected, time of day, and so on, simply by using the impact score corresponding to the simulation 412 and without administrators having to specify and manage a complex set of rules and access policies.

Figure 5:
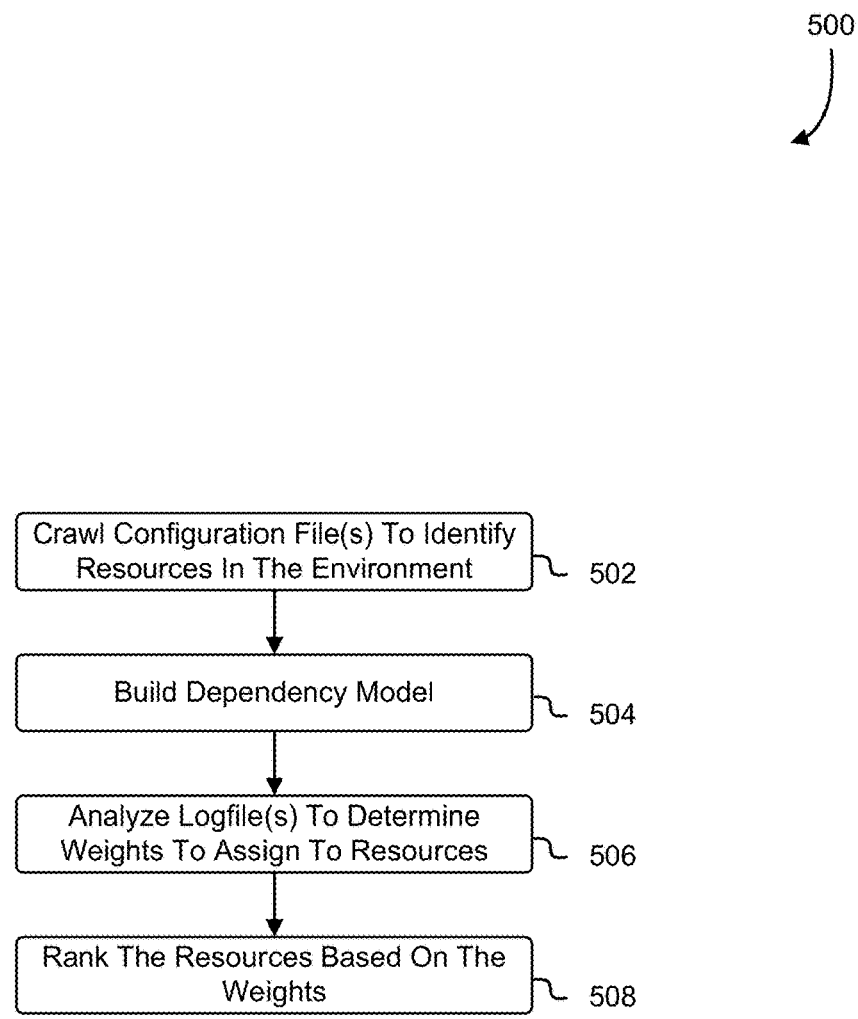
FIG. 5 is a flow diagram that illustrates an example of generating a dependency model in accordance with an embodiment.

FIG. 5 is a flow diagram illustrating an example of a process 500 for generating a dependency model in accordance with various embodiments. Some or all of the process 500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 7:
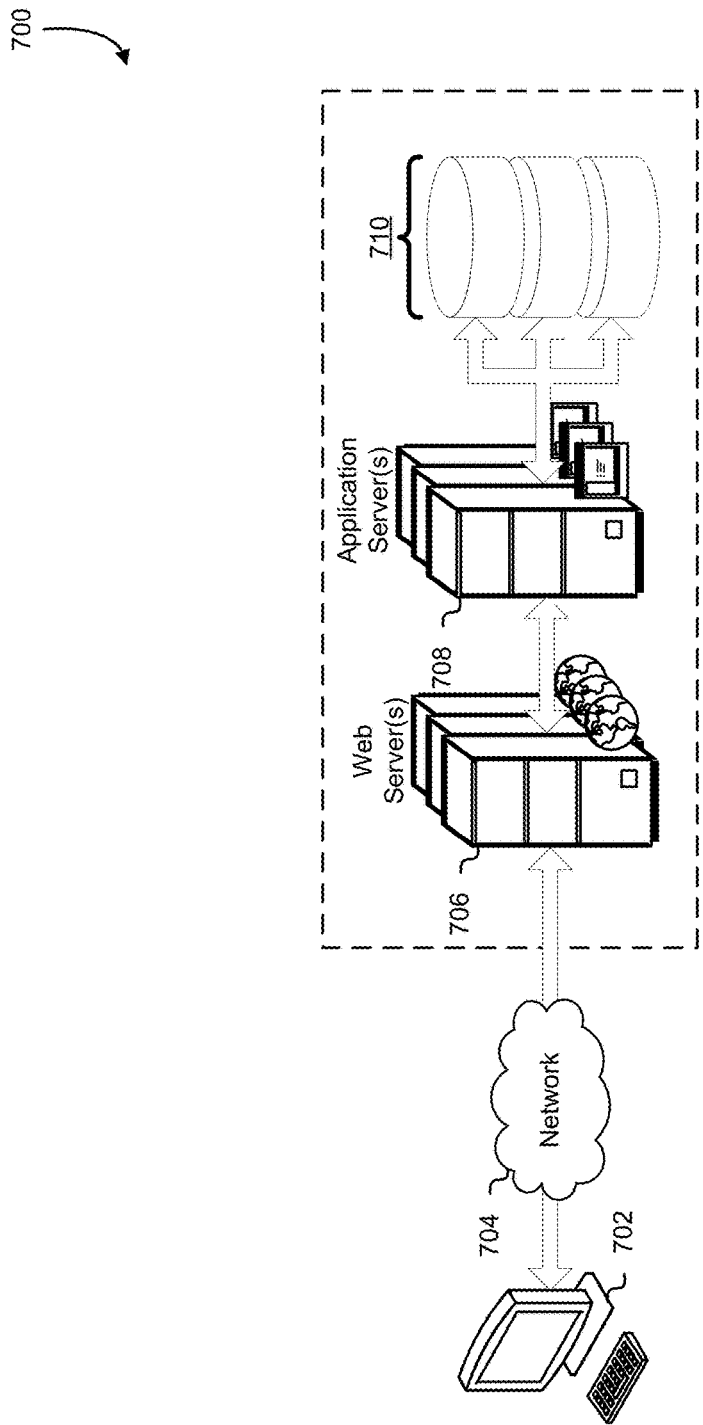
FIG. 7 illustrates an environment in which various embodiments can be implemented.

For example, some or all of process 500 may be performed by execution of a crawler application such as the crawler application 214 of FIG. 2 and/or a log analyzer such as the log analyzer 314 of FIG. 3, using any suitable system or systems, such as a server in a data center, by various components of the environment 700 described in conjunction with FIG. 7, such as the one or more web servers 706 or the one or more application servers 708, by multiple computing devices in a distributed system of a computing resource service provider, or by any electronic client device such as the electronic client device 702. The process 500 includes a series of operations wherein a crawler application reads and analyzes configuration files to identify resources in a computing environment, generates a dependency graph based on relationships between resources determined from the configuration files, analyzes one or more logfiles in the computing environment in order to calculate a rank for each of the resources in the model, and updates the dependency model to include the ranks.

In 502, the system performing the process 500 reads a set of configuration files of the computing environment that includes information usable to generate a topological map of the resources in the computing environment. As noted above, the set of configuration files may include information identifying the resources (e.g., hosts) within the computing environment as well as relationships between the resources (e.g., whether host A has access to host B, etc.)

In 504, the system performing the process 500 generates a dependency model in the manner described in the present disclosure. For example, the dependency model may be a directed graph with the resources represented by nodes of the graph and with the edges of the graph representing the direction/flow of requests between the resources. The system may further generate the dependency model to include additional information, such as resource classifications, types of applications/services, and other topological information.

In 506, the system performing the process 500 reads one or more logfiles to accumulate historical usage information associated with the resources in the computing environment. The logfiles may include system logs, application logs, access logs (also known as security logs), and various other event logs. In some examples, a "system log" refers to logs system errors, warnings, or information related to an operating system and operating system services. In some examples, an "application log" refers to errors, warnings, or information relating to the operation of a software program, driver, or service running under the control of an operating system. In some examples, an "access log" refers to a log of security-related events, such as whether an authentication request was successful. Note that the present disclosure contemplates analysis of other types of logfiles as being within the scope of the present disclosure.

In 508, the system performing the process 500 assigns weights to each of the nodes based at least in part on information from the logfiles analyzed in 506. For example, a node may be assigned a weight from 1 to 10 depending on how frequently its corresponding resource is accessed in relation to other similar resources in the computing environment, with 1 being the least accessed and 10 being the most accessed. Additionally or alternatively, the weight could be modified depending on a number of unique other hosts that submitted requests to the resource. Additionally or alternatively, the weight could be modified based on a level of importance of the other hosts that submitted requests to the resource (e.g., if the host rank of the accessing host exceeds a first threshold, the resource weight is increased by 10%, if the host rank of the accessing host exceeds a second threshold, the resource weight is increased by 20%, etc.). The weight may be used as a rank score for the resource. As the topology of the computing environment changes over time, it may be necessary to re-run the process 500 and/or retrain a machine learning algorithm in order to account for the changes in the topology.

In some embodiments, the process 500 and the operations described in conjunction with FIGS. 2 and 3 are performed prior to a command being detected and intercepted, such as by the simulator 114 or the simulator 414 of FIGS. 1 and 4 respectively. However, in some embodiments, the process 500 may be performed in real time as a result of detection and interception of the command. The former embodiments may provide a benefit of quicker simulation because the dependency model may have already been generated and weights already assigned. In some of these embodiments, a result of executing commands that add or remove computing resources from being available in the computing environment, the process 500 may be repeated in whole or in part in order to update the dependency model. On the other hand, the latter embodiments may provide benefits in computing environments where resources and/or dependencies change frequently. Note that one or more of the operations performed in 502-08 may be performed in various orders and combinations, including in parallel.

Figure 6:
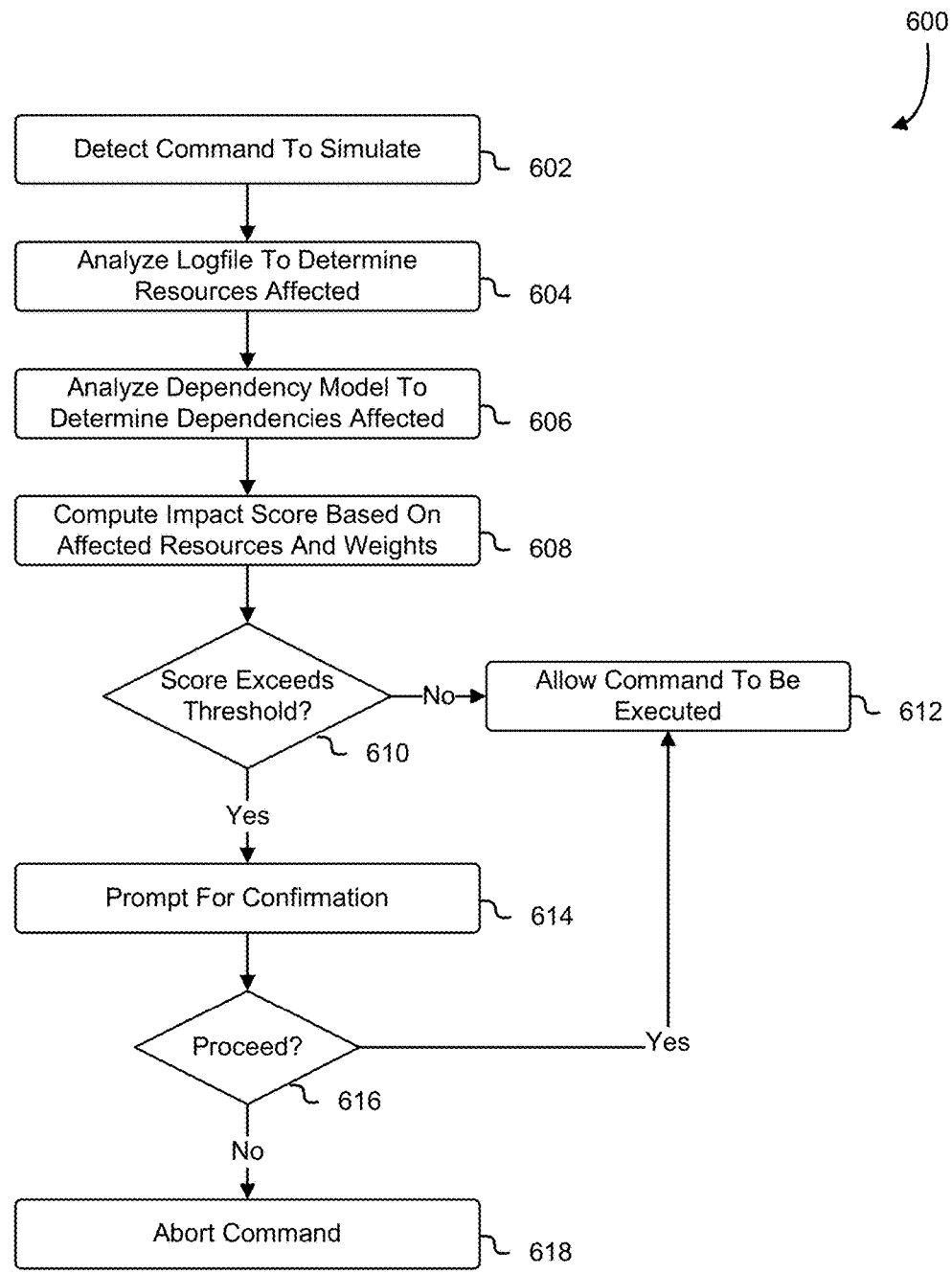
FIG. 6 is a flowchart that illustrates an example of simulating impact of a command in accordance with an embodiment.

FIG. 6 is a flowchart illustrating an example of a process 600 for simulating the impact of a command in accordance with various embodiments. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 600 may be performed by a simulator, such as the simulator 114 of FIG. 1, by any suitable system, such as a server in a data center, by various components of the environment 700 described in conjunction with FIG. 7, such as the one or more web servers 706 or the one or more application servers 708, by multiple computing devices in a distributed system of a computing resource service provider, or by any electronic client device such as the electronic client device 702. The process 600 includes a series of operations wherein a command to simulate is detected, one or more logfiles are examined to determine the affected resource(s), a dependency model (e.g., the dependency model generated in the process 500 of FIG. 5) is analyzed to determine weights and resources directly and indirectly impacted by the command, and a score is calculated based on the weights and resources determined. Based on the score, the system performing the process may perform various actions. For example, if the score indicates the impact of the command is minor (e.g., below a threshold), the system may proceed with performing the operation without further interaction from the entity that submitted the command. On the other hand, if the score indicates a major impact (e.g., above a threshold) or an impact score exceeding a standard deviation of scores of similar commands, the system may prompt the entity that issued the command for confirmation before proceeding.

In 602, the system performing the process 600 detects that a command has been submitted, such as by the operator 102 of FIG. 1. The system determines that the command is of a type to be simulated; that is, certain commands that only minimally impact resources (e.g., such as getting a list of active resources), may be considered benign and not necessary to simulate. On the other hand, certain commands such as commands that delete data, remove hosts, or consume scarce resources may be among commands predetermined that should be simulated prior to execution of the command. The system may determine that a command should be simulated from a list of commands (e.g., in a configuration file) that have been determined should be simulated.

In 604, the system performing the process 600 may analyze one or more logfiles as described in the present disclosure to determine the possible resources that will be affected by execution of the command detected in 602. That is, because certain logfiles may include past execution of commands and the types of commands that were executed, analysis of such a logfile may provide information such as duration of previous executions of the command, past impact score of executions of the command, and results/statuses of the executions. Note, however, that it is contemplated that in some embodiments the dependency model may be generated (e.g., by the process 500 of FIG. 5) to include sufficient information such that the dependency model may be analyzed at this step in the process 600 rather than a logfile.

In 606, the system performing the process 600 locates the resources in the dependency model (e.g., generated by the process 500 of FIG. 5) that would be affected by the command, and in 608, calculates, based on the weights associated with the affected resources, and impact score. In embodiments, the system also locates, based on the dependencies and/or flows of communication in the dependency model, resources that would be indirectly affected by the command, and further calculates the impact score based on weights associated with the indirectly affected resources. In some examples, an indirectly affected resource is a resource whose ability to perform the operations for which it is responsible is impeded as a result of the command's direct effect on a resource upon which the indirectly affected resource depends. In an example, a web server sends a request to a data storage server for data that the web server uses for generating the webpages provided by the web server. A command that causes the data storage server to be unavailable temporarily or permanently (e.g., a command to restart, a delete command, a format command, etc.) results in the data storage server being directly affected and the web server being indirectly affected because the web server's ability to provide webpages will be impacted by the unavailability of the data storage server. The dependency model for a computing environment having only the above-mentioned web server and data storage server might look something like:

[web server]→[data storage server]

Note that the weights for indirectly affected resources may be weighted differently than directly affected resources. Furthermore, a level of indirection may affect the weight. For example, the weight for an indirectly affected resource with a first level of indirection may be reduced by 50% (e.g., the web server above), whereas the weight for an indirectly affected resource with a second level of indirection (e.g., a resource that depends on the web server above) may be reduced by 75%. In some embodiments, the impact score may be normalized to fall within a specific range.

In 610, the system performing the process 600 determines whether the impact score is unusual or excessive. For example, if the impact score exceeds a predefined threshold, the system may proceed to 614 to prompt for confirmation to proceed with execution of the command. Additionally or alternatively, if the impact score is uncharacteristic of typical impact scores for the command (e.g., exceeds a certain standard deviation from the norm for that command) the system may proceed to 614 to prompt for confirmation. Otherwise, the system may proceed to 612 and cause the command to be executed without further interaction of an operator or administrator.

In 614, the system performing the process 600 may prompt the operator for confirmation whether to proceed with the execution of the command. To aid the operator in determining whether to proceed, the system may provide the operator with the impact score, an average impact score of previous executions of similar commands, a list of directly and/or indirectly affected resources, and any other relevant information. In some embodiments, if the impact score is too great (e.g., exceeds a certain threshold, exceeds a certain threshold standard deviation, etc.) the system may request confirmation from a second operator or an administrative entity authorized to review and confirm such commands. Thus, it is contemplated that there may be multiple thresholds, each corresponding to a different level of authorization to proceed. Note that in some embodiments, the system may additionally or alternatively notify the operator and/or administrator about the impact score. For example, if the impact score is above a certain threshold, the system may prompt the operator for confirmation but may also send a notification email to a system administrator without requiring confirmation from the system administrator.

In 616, if the response to the prompt for confirmation in 614 indicates to proceed with executing the command, the system may proceed to 612 to allow the command to be executed. Alternatively, if confirmation is not received, the system may proceed to 618 and not proceed with execution of the command. Note that one or more of the operations performed in 602-18 may be performed in various orders and combinations, including in parallel.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and convey information back to a user of the device. Examples of such client devices include personal computers, cell phones, handheld messaging devices, laptop computers, tablet computers, set-top boxes, personal data assistants, embedded computer systems, electronic book readers, and the like.

The environment 700 in one embodiment is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than those illustrated in FIG. 7. Thus, the depiction in FIG. 7 should be taken as being illustrative in nature and not limiting to the scope of the disclosure.

The network 704 can include any appropriate network, including an intranet, the Internet, a cellular network, a local area network, a satellite network or any other network, and/or combination thereof. Components used for such a system can depend at least in part upon the type of network and/or environment selected. Many protocols and components for communicating via such network 704 are well known and will not be discussed in detail. Communication over the network 704 can be enabled by wired or wireless connections and combinations thereof. In an embodiment, the network 704 includes the Internet and/or other publicly-addressable communications network, as the environment 700 includes one or more web servers 706 for receiving requests and serving content in response thereto, although for other networks an alternative device serving a similar purpose could be used as would be apparent to one of ordinary skill in the art.

The illustrative environment 700 includes one or more application servers 708 and data storage 710. It should be understood that there can be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, "servers" may refer to a programming module being executed on a computer system. As used, unless otherwise stated or clear from context, the term "data store" or "data storage" refers to any device or combination of devices capable of storing, accessing, and retrieving data, which may include any combination and number of data servers, databases, data storage devices, and data storage media, in any standard, distributed, virtual, or clustered environment.

The one or more application servers 708 can include any appropriate hardware, software and firmware for integrating with the data storage 710 as needed to execute aspects of one or more applications for the electronic client device 702, handling some or all of the data access and business logic for an application. The one or more application servers 708 may provide access control services in cooperation with the data storage 710 and is able to generate content including, text, graphics, audio, video, and/or other content usable to be provided to the user, which may be served to the user by the one or more web servers 706 in the form of HyperText Markup Language (HTML), Extensible Markup Language (XML), JavaScript, Cascading Style Sheets (CSS), JavaScript Object Notation (JSON), and/or another appropriate client-side structured language. Content transferred to the electronic client device 702 may be processed by the electronic client device 702 to provide the content in one or more forms including forms that are perceptible to the user audibly, visually, and/or through other senses. The handling of all requests and responses, as well as the delivery of content between the electronic client device 702 and the one or more application servers 708, can be handled by the one or more web servers 706 using PHP: Hypertext Preprocessor (PHP), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The data storage 710 can include several separate data tables, databases, data documents, dynamic data storage schemes, and/or other data storage mechanisms and media for storing data relating to a particular aspect of the present disclosure. For example, the data storage 710 may include mechanisms for storing various types of data and user information 716, which can be used to serve content to the electronic client device 702. The data storage 710 also is shown to include a mechanism for storing log data, such as application logs, system logs, access logs, and/or various other event logs, which can be used for reporting, analysis, or other purposes. It should be understood that there can be many other aspects that may need to be stored in the data storage 710, such as page image information and access rights information, which can be stored in any of the above listed mechanisms as appropriate or in additional mechanisms in the data storage 710. The data storage 710 is operable, through logic associated therewith, to receive instructions from the one or more application servers 708 and obtain, update, or otherwise process data in response thereto. The one or more application servers 708 may provide static, dynamic, or a combination of static and dynamic data in response to the received instructions. Dynamic data, such as data used in web logs (blogs), shopping applications, news services, and other applications may be generated by server-side structured languages as described or may be provided by a content management system (CMS) operating on, or under the control of, the one or more application servers 708.

In one embodiment, a user, through a device operated by the user, can submit a search request for a match to a particular search term. In this embodiment, the data storage 710 might access the user information to verify the identity of the user and obtain information about items of that type. The information then can be returned to the user, such as in a results listing on a web page that the user is able to view via a browser on the electronic client device 702. Information related to the particular search term can be viewed in a dedicated page or window of the browser. It should be noted, however, that embodiments of the present disclosure are not necessarily limited to the context of web pages, but may be more generally applicable to processing requests in general, where the requests are not necessarily requests for content.

The various embodiments further can be implemented in a wide variety of operating environments, which in some embodiments can include one or more user computers, computing devices, or processing devices that can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via the network 704. These devices also can include virtual devices such as virtual machines, hypervisors, and other virtual devices capable of communicating via the network 704.

Various embodiments of the present disclosure utilize the network 704 that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), and Common Internet File System (CIFS). The network 704 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In embodiments utilizing the one or more web servers 706, the one or more web servers 706 can run any of a variety of server or mid-tier applications, including Hypertext Transfer Protocol (HTTP) servers, FTP servers, Common Gateway Interface (CGI) servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment 700 can include a variety of data stores and other memory and storage media as discussed above. These can reside in a variety of locations, such as on a storage medium local to (and/or resident in) one or more of the computers or remote from any or all of the computers across the network 704. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit (CPU or processor), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
   identifying, from configuration data, a set of computing resources in a computing environment;
   generating a dependency graph having nodes representing the set of computing resources and at least one edge representing a communication path between a pair of resources in the set of computing resources;
   associating, based at least in part on an analysis of a logfile of a set of events that occurred in the computing environment, a set of weights with the nodes; and
   as a result of receiving, from a client device, a request to perform a command:
      determining, based at least in part on the logfile and the at least one edge, an impacted subset of the set of computing resources;
      calculating, based at least in part on a subset of the set of weights associated with the impacted subset of computing resources, an impact score; and
      requesting, as a result of the impact score reaching a value relative to a threshold, authorization to perform the command.

2. The computer-implemented method of claim 1, further comprising updating the dependency graph to associate the set of weights with the nodes.

3. The computer-implemented method of claim 1, wherein the authorization is requested from an entity different from an entity associated with the client device.

4. The computer-implemented method of claim 1, further comprising declining to proceed with performing the command as a result of failing to receive the authorization.

5. A system, comprising:
   one or more processors; and
   memory including executable instructions that, as a result of execution by the one or more processors, cause the system to:
      identify, from configuration data of a computing environment, a first resource and a second resource;
      generate a model that represents the first resource associated with a first weight, the second resource associated with a second weight, and a communication path between the first resource and the second resource; and
      as a result of receiving a command to perform against the first resource:
         determine, based at least in part on the communication path, that the second resource would be impacted by performance of the command;
         calculate, based at least in part on the first weight and the second weight, a score that represents an impact of the command in the computing environment; and
         perform, as a result of an action determined based at least in part on the score, the action.

6. The system of claim 5, wherein the first resource and the second resource are virtual computing resources.

7. The system of claim 5, wherein:
   the executable instructions include instructions that, further as a result of receiving the command, cause the system to analyze a logfile to determine historical information associated with the command; and the executable instructions that cause the system to calculate the score cause the system to calculate the score further based at least in part on the historical information.

8. The system of claim 5, wherein the model is a directed graph.

9. The system of claim 8, wherein direction of edges in the directed graph indicates direction of flow of requests made between nodes connected by the edges.

10. The system of claim 5, wherein the executable instructions that cause the system to calculate the score further include instructions that cause the system to calculate the score using a machine learning algorithm.

11. The system of claim 10, wherein the executable instructions further include instructions that cause the system to:
receive, after the command is performed, input indicating an actual impact of performing the command; and
adjust the machine learning algorithm based at least in part on the input.

12. The system of claim 5, wherein the action determined is based at least in part on the score reaching a value relative to a threshold.

13. The system of claim 12, wherein:
the command is received from an operator;
on a condition that the operator has a first level of access, the threshold is a first threshold; and
on a condition that the operator has a second level of access, the threshold is a second threshold.

14. A non-transitory computer-readable storage medium having stored thereon executable instructions that, as a result of being executed by one or more processors of a computer system, cause the computer system to at least:
identify, from configuration data, a set of computing resources;
generate a model that represents:
the set of computing resources; and
at least one communication path between resources in the set of computing resources;
associate a set of weights with the set of computing resources;
receive a request to perform a command;
determine, based at least in part on the model, a computing resource of the set of computing resources that would be impacted by execution of the command;
calculate, based at least in part on the set of weights, an impact score associated with the command; and
perform, depending on the impact score, a first action or a second action.

15. The non-transitory computer-readable storage medium of claim 14, wherein the executable instructions that cause the computer system to perform the first action or the second action further include instructions that cause the computer system to:
on condition that the impact score indicates an uncharacteristic impact, perform the first action; and
on a condition that the impact score indicates a characteristic impact, perform the second action.

16. The non-transitory computer-readable storage medium of claim 14, wherein:
the first action is to request authorization to perform the command; and
the second action is to perform the command.

17. The non-transitory computer-readable storage medium of claim 14, wherein:
the executable instructions further include executable instructions that cause the computer system to:
determine, from the set of computing resources, a first resource that would be directly affected by the command, the first resource associated with a first weight; and
determine, based at least in part on the first resource and the model, a second resource from the set of computing resources that would be indirectly affected by the command, the second resource associated with a second weight; and
the executable instructions that cause the computer system to calculate the impact score include instructions that cause the computer system to calculate the impact score based at least in part on the first weight and the second weight.

18. The non-transitory computer-readable storage medium of claim 14, wherein the executable instructions that cause the computer system to associate the set of weights with the set of computer resources further include instructions that cause the computer system to, for each resource in the set of computing resources:
analyze data in a logfile to determine significance of the resources; and
determine an amount of weight to associate with the resource based at least in part on the significance.

19. The non-transitory computer-readable storage medium of claim 18, wherein the significance is based at least in part on one or more of:
a type of data provided by the resource,
an importance of another resource that submits requests to the resource, or
a quantity of resources that submit requests to the resource.

20. The non-transitory computer-readable storage medium of claim 18, wherein the data in the logfile includes:
first event data recorded in a local logfile of the computer system; and
second event data recorded in a set of logfiles that are local to at least a subset of the set of computing resources.

* * * * *